United States Patent [19]

Whitehouse et al.

[11] Patent Number: 4,894,795
[45] Date of Patent: Jan. 16, 1990

[54] HIGH-RESOLUTION TECHNIQUE FOR TIME-FREQUENCY SIGNAL ANALYSIS USING MODIFIED WIGNER-VILLE ANALYSIS

[75] Inventors: Harper J. Whitehouse, San Diego, Calif.; Boualem Boashash, Quunsland, Austria

[73] Assignee: The United States of America as represented by the Secretary of the Navy, Washington, D.C.

[21] Appl. No.: 43,651

[22] Filed: Apr. 28, 1987

[51] Int. Cl.$^4$ .............................................. G06G 7/19
[52] U.S. Cl. .................................................. 364/807
[58] Field of Search ....................... 364/807, 861, 827; 375/819, 121

[56] References Cited

PUBLICATIONS

R. Schmidt, "Multiple Emitter Location and Signal Parameter Estimation", IEEE Trans. on Antennas and Propagation, vol. Ap-34, No. 3, Mar. 1986, pp. 276-280.
R. Schmidt, "Multiple Source DF Signal Processing:An Experimental System", IEEE Trans. on Antennas & Propagation, vol. Ap-34, No. 3, Mar. 1986, pp. 281-290.
B. Boya Chache, "Wigner Analysis of Time-Varying Signals", Signal Processing II: Theory & Applications (1983), pp. 705-706.
D. Gabor, "Theory of Communication", Journal IEE) 93(111), pp. 429-57 (1946).
L. Cohen, "Generalized Phase-Space Distribution Functions", Journal of Mathematical Physics, vol. 7, May 1966, pp. 751-86.
B. Boushash & H. Whitehouse, "Seasmic Applications of the Wigner-Ville Distribution", 8/86, pp. 34-37, IEEE.
B. Boushash, P. Black & H. Whitehouse, "An Efficient Implementation for Real Time Applications of the Wigner-Ville Distribution", Real-Time Signal Processing, Optical Information Processing Calf.

Primary Examiner—Jerry Smith
Assistant Examiner—Charles B. Meyer
Attorney, Agent, or Firm—Harvey Fendelman; Thomas G. Keough

[57] ABSTRACT

An apparatus and method of improving the resolution of a linear FM signal $s(t) = a(t)\cos \phi(t)$ where $\phi(t) = 2\pi(s_0 t + \alpha t^2)$ is provided by a modified computation of the Wigner-Ville Distribution. An analytical signal $$z(t) = \sum_{i=1}^{N} a_i \phi(t - \tau_i)$$

is translated or calculated from the received linear FM signal r(t) so that a Wigner-Ville Kernel sequence $$z\left(t + \frac{\tau}{2}\right) z^*\left(t - \frac{\tau}{2}\right)$$

is formulated. An analysis of the frequency of the kernel sequence follows in accordance with a high resolution estimation technique that may include a kind of a least squares approximation fit or an eigenvector spectral estimator such as MUSIC OR ESPRIT to provide an improved time/frequency representation having a resolution of about an order of magnitude better as compared to a conventional discrete Fourier transform frequency analyze of the kernel sequence.

39 Claims, 1 Drawing Sheet

HIGH-RESOLUTION TECHNIQUE FOR TIME-FREQUENCY SIGNAL ANALYSIS USING MODIFIED WIGNER-VILLE ANALYSIS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Some of the first evidence of the use of two-dimensional time frequency representations of communication signals was presented in a paper by D. Gabor entitled "Theory of Communication", *Journal IEE (London)* 93 (*III*), pp. 429–457, (1946). Shortly thereafter, J. Ville wrote a paper entitled "Theories et Application de la notion de signal analytique", *Cables et Transmissions* 2A (1) pp. 61–74, (1948), in which his approach is based on the space/momentum representation of quantum mechanical variables introduced in a paper by E. P. Wigner entitled "On the Quantum Correction for Thermo-Dynamic Equilibrium", *Phys. Review* 40, pp. 749–759, (1932). Generally speaking, the time/frequency distribution was introduced because of the inability of classical representations such as correlation functions or spectral density functions to display information contained in non-stationary signals. These non-stationary signals whose spectral content varies with time are of major engineering importance and the analyses of these signals to enable easy interpretation has obvious advantageous.

Totally different signals may have the same spectral density. This anomaly is attributed to the fact that the information which differentiates these signals is contained in the phase spectrum, as will be elaborated on below. The localization in time of a particular frequency of the signal is measured by the group delay function $\tau_g(f)$, which is the derivative of the phase spectrum, $$\tau_g(f) = \frac{1}{2\pi} \cdot \frac{d\theta(f)}{df} \quad (1)$$

where $\theta(f)$ is the phase spectrum of the signal.

The phase spectrum is an integral part of the representation of the signal. Removing this information will lead to an effective scrambling of the signal's frequency information. Therefore, the spectral density which represents the distribution of signal energy over the frequency axis must, in general, be accompanied by the time delay $\tau_g(f)$ which localizes in time the particular frequency of the signal, if the representation of the signal is to make sense.

In like manner the instantaneous power of a signal $[s(t)]^2$ which represents the distribution of signal energy over the time axis alone cannot characterize the signal, but must be coupled with the instantaneous frequency $f_i(t)$ of the signal which localizes in time the particular frequency of the signal.

This instantaneous frequency $f_i(t)$ was defined in the above identified article by Ville as:

$$f_i(t) = \frac{1}{2\pi} \cdot \frac{d\phi(t)}{dt} \quad (2)$$

where $z(t) = a(t)e^{j\phi(t)}$ is the analytic signal associated with the real signal s(t) as follows:

$$z(t) = s(t) + jH[s(t)] \quad (3)$$

where H is the Hilbert transform H[s(t)]

$$H[s(t)] = \frac{1}{\pi} \int_{-\infty}^{\infty} \frac{s(\xi)d\xi}{t - \xi} \quad (4)$$

As suggested, in the Gabor article, the signals can be represented in a wider space that would combine all this information in a more accessable manner. Such a representation would for example, provide a distribution of signal energy E(t,f) versus both time and frequency. A first approach adopted by many authors was to set out a "discretization" of the time domain. A window $p(t-t_o)$ is applied to the real signal s(t) and the magnitude squared of the Fourier transform is calculated. By varying t in multiples of an increment, $\Delta$, a spectral density is obtained that is a function of f and $t_o$. Information that was otherwise lost when the spectral density of the whole signal is used may now be retrieved by noting the position $t_o$ of the window (the increment $\Delta$) with a resolution as determined by the width of this window. For an optimum analysis based on this method the window width $\Delta$ is selected which satisfies the definition:

$$\Delta = \frac{1}{\sqrt{\left[\frac{df_i}{dt}\right]}} \quad (5)$$

As may be apparent from this analysis a basic problem arises in that this method requires an a-priori knowledge of the instantaneous frequency $f_i(t)$, which can only be obtained after a time/frequency analysis. It is obvious that a successful procedure based on this method must be iterative.

Another equivalent approach consists of the "discretizing" of the frequency domain, by passing the signal through a bank of adjacent filters centered around frequencies nf and with a bandwidth $\Delta(f)$, and applying an implicit windowing $P(f-f_o)$ to the Fourier transform S(f) of the signal. Bouachache et al showed in their article entitled "A Necessary and Sufficient Condition for the Positivity of Time Frequency Distributions", *Comptes Rendus Acad. des Sciences, Paris*, 288, Series A, pp. 307–309, (1979) that these time/frequency representations are equivalent if P(f) is the Fourier transform of p(t).

A general class of time/frequency distributions was proposed in an article by Cohen entitled "Generalized Phase Space Distributions", *Journal of Mathematical Physics*, 7, pp. 781–786, (1966). In a later study Bouachache, *Representation tempsfrequence*, PhD. Thesis University of Grenoble 1982 showed that among Cohen's general class, the Wigner-Ville Distribution (WVD) performs best when applied to the analysis of modulated signals. A thorough analysis of the Bouachache study is set forth in the article entitled "Sur la Possibilite d'utiliser la Representation Conjointe en temps et Frequence dans l'analyse des Signaux Modules en Frequence emis en Vibrosismique", *Colloque Nat. Trait. Sign.*, 7th GRETSI, pp. 121:1–121:6, (1979).

The WVD is expressed as equation 6

$$W(t,f) = \int_{-\infty}^{\infty} z\left(t + \frac{\tau}{2}\right) z^*\left(t - \frac{\tau}{2}\right) e^{-j2\pi f t} d\tau \qquad (6)$$

A major significance of Cohen's formula for signal analysis is that any useful time/frequency distribution is the result of a two-dimensional smoothing of the WVD, so that a measure of the localization in time and frequency of the time/frequency distribution is relative to the WVD. The above cited articles of Bouachache also established that the WVD of a signal is concentrated along its instantaneous frequency $f_i(t)$ with a resolution that is a function of the BT product of the signal.

SUMMARY OF THE INVENTION

The present invention is directed to providing a method and apparatus for improving the resolution of a linear FM signal such as that used for seismic analysis, active radar/sonar applications, acoustic non-destructive evaluations, acoustic biomedical imaging and inverse synthetic aperture imaging radar/sonar. A received signal $$r(t) = \sum_{i=1}^{N} a_i s(t - \tau_i)$$

of a linear FM signal $s(t) = a(t) \cos \phi t$ where $$\phi(t) = 2\pi(s_o t + \alpha t^2)$$

is translated to an analytical signal form $$z(t) = \sum_{i=1}^{N} a_i e^{j\phi(t-\tau_i)}.$$

The analytic signal form is formulated into a Wigner-Ville kernel sequence $$z\left(t + \frac{\tau}{2}\right) z^*\left(t - \frac{\tau}{2}\right)$$

for a subsequent analysis of the frequency of the kernel sequence by a high estimation that may include a kind of a least squares approximation fit or an eigenvector spectral estimator such as MUSIC or ESPRIT to provide an improved time/frequency representation.

A prime object of the invention is to improve the resolution of a linear FM signal.

Further object is to provide for an improved signal resolution represented by Wigner-Ville distributions.

Further object is to provide for an improved signal resolution in which Wigner-Ville kernel sequences are analyzed by a high resolution estimation such as a kind of least squares approximation fit to provide an improve time/frequency representation.

Still yet another object is to provide for an improved signal resolution in which Wigner-Ville kernel sequences are analyzed by an eigenvector spectral estimator such as MUSIC or ESPRIT to provide an improved time/frequency representation.

Still yet a further object is to provide an improved resolution of an linear FM signal in which the resolution is high even for short window in a Wigner-Ville distribution.

Still yet a further object is to provide for an improved resolution of a linear FM signal in which the resolution is independent of the duration of the Wigner-Ville kernel sequence for long windows.

These an other objects of the invention will become more readily apparent for the ensuing description when taken in conjunction with the appended claims and drawings.

DESCRIPTION OF THE PREFERRED EMBODIMENT

Figure 1:
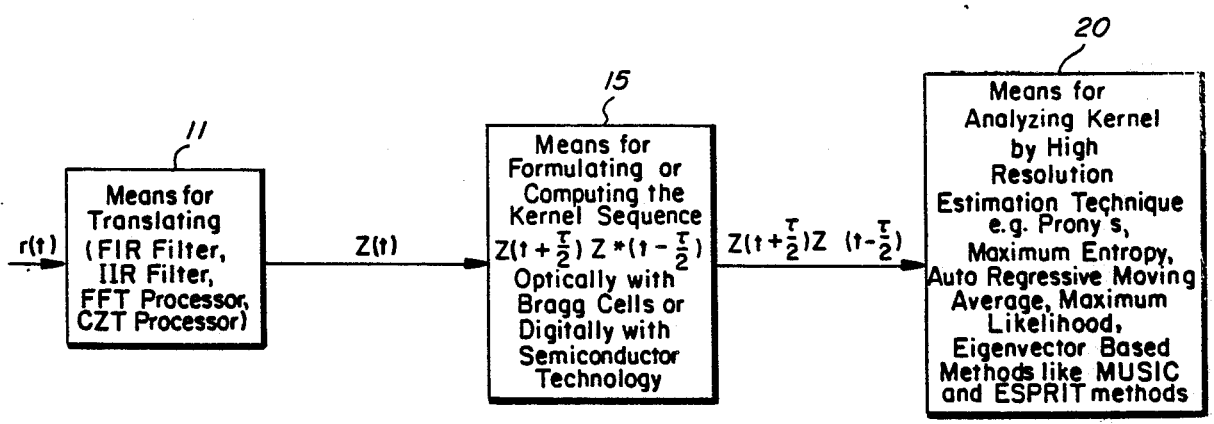
FIG. 1 sets forth a block diagram representation of the principle constitutes of an apparatus for improving the resolution of an linear FM signal.

The use of the Wigner-Ville distribution is a preferred method of evaluating the frequency dependent absorption of seismic waves propagating in the earth. This approach was theoretically developed by Bouachache in his article "Wigner Analysis of Time Varying Signals. An application of a seismic is given in "*EURASIP 83 In Signal Processing II, Theo. & Appln. Ed.,* H. V. Schussler Elsvier Science Pub. B.V. (North Holland, p. 703–706 (1983)). Other applications include active radar/sonar, acoustic non-destructive evaluation, acoustic bio-medical imaging, and inverse synthetic aperture imaging radar/sonar.

Three properties that make the WVD attractive and suitable for a variety of signal analyzes are, first, that the first moments of the WVD yield directly the instantaneous frequency $f_i(t)$ and the group delay $\tau_g(f)$ of the signal, describes the "internal organization" of the signal (this estimation is independent of the windowing applied to the WVD, assuming some nonrestrictive conditions on the window are met); second, the WVD directly visualizes the instantaneous frequency $f_i(t)$ and group delay $\tau_g(f)$, by exhibiting a range of peaks along to the curve described by $f_i(t)$ and $\tau_g(f)$; and, third, the spectral extent of the WVD reflects the bandwidth of the signal; the maximum frequency $f_m$ of the signal can be easily localized in time as the maximum instantaneous frequency or the fluctuations of $f_m$ with time are easily followed.

In a practical application of this new capability a measurement technique called "vertical seismic profile" has a receiver lowered into a well bore and a seismic source at the surface excites the earth with a linear FM waveform $s(t)$ of the form $a(t) \cos \phi(t)$ where $\phi(t) = 2\pi(s_o t + \alpha t^2)$ and the earth acts as a filter. The object of the Wigner-Ville analysis is to determine the instantaneous frequency of the received signal $r(t)$ that can be expressed as $$\sum_{i=1}^{N} a_i s(t - \tau_i).$$

Since hardware limitations require that only a portion of the analytic signal from the receiver is used for the Wigner-Ville calculation, it is necessary that the window used to weight the signal not influence the measurement of the instantaneous frequency. Matched filters at a receiver, receives a reflected waveform attributed to multiple fixed scatterer bounderies between layers with different acoustic impedancies. This received signal is the superposition of the echo from each of the scatterers in the seismic laminate. Thus the output of the matched filter receiver will be the superposition of the zero doppler cross ambiguity function of the signal received from each of the scattereres with the reference function used to excite the earth. From the reflected signal the acoustic impedance of the earth layers can be calculated. A generalization of this technique appears in J. P. Jones article "Impediography: A New Ultrasonic Technique for Nondestructive Testing and Medical Diagnosis", *In Utrasonic Int. Conf. Proc.* (IPC Sci. and Tech. Press, London, (1973). It discusses the case of continuous scattering from a spatially varying impedance distribution, and was named "impediography". Since the Wigner-Ville distribution is the two-dimensional Fourier transform of the ambiguity function then it is natural to propose cross Wigner-Ville analysis as a method of radar/sonar analysis where doppler frequency shifts are also present. Here it is pointed out that for cross Wigner-Ville analysis the analysis kernel $$z_1\left(t + \frac{\tau}{2}\right)z_2^*\left(t - \frac{\tau}{2}\right)$$

is linear in the second signal if the first signal is specified. Thus by viewing the seismic reflectometry signal processing in the Fourier domain, either conventional Wigner-Ville analysis or generalized Wigner-Ville analysis can be used. The latter being the method of choice if the transmitted signal is a linear FM waveform and high resolution of the scattering distribution is desired.

In the foregoing it has been assumed that the scatterers introduced no phase shift of the signal and that the propagation was nondispersive. If, however, these conditions are not true then the cross Wigner-Ville distribution will in general be complex instead of real. It this case the real part of the distribution is computed for analysis.

The Wigner-Ville analysis provides a robust means for estimating the instantaneous frequency of a non-stationary signal such as a linear FM signal $s(t) = a(t) \cos \phi(t)$ where $\phi(t) = 2\pi(s_0 t + \alpha t^2)$.

The Wigner-Ville analysis can be expressed as a two-step process in which the first step concerns the forming of a bilinear form $$z\left(t + \frac{\tau}{2}\right)z^*\left(t - \frac{\tau}{2}\right)$$

using the analytic signal $z(t)$ associated with the received signal $r(t)$ of the real signal $s(t)$. The real signal $s(t)$ obeys Bedrosian's conditions, that is, two conditions. Condition one is that the spectra of a (t) and cos $\phi(t)$ are disjointed. Condition number 2 is that the BT product (bandwidth and duration) is large, so that if $s(t) = a(t) \cos \phi(t)$ where $\phi(t) = 2\pi(s_0 t + \alpha t^2)$, a linear FM waveform, then the analytic signal becomes $z(t) = a(t)^{j\phi t}$ that also might be expressed as $$\sum_{i=1}^{N} a_i e^{j\phi(t - \tau i)}$$

A second step of the process is that a Fourier transform of the bilinear form (Wigner-Ville sequence) is taken with integration variable $\tau$.

For the linear FM signal the bilinear form (WV kernel sequence) becomes:

$$z(t + \tau)z^*(t - \tau) = e^{+j4\pi\alpha t\tau}$$

The bilinear form as a function of $\tau$ is seen as been a sinusoid with frequency proportional to the chirp parameter $\alpha$. A coarse estimate of the frequency of this sinusoid is provided by the frequency of the peak of its Fourier transform.

It has been discovered however, for the short integration time desirable in this application, that the Fourier transform is not a high resolution spectral estimae. In addition, a window function is needed to suppress sidelobes and this window further reduces the resolution of the Fourier transform, (the definition of the window function is set out above). A high resolution model is substituted which is based on a spectral estimator such as established by the Pisarenko spectral analysis. This analysis is discussed at length by V. F. Pisarenko in his article entitled "The Retrieval of Harmonics from a Covariance Function", *Geophysics, J. R. Astr. Soc.* 33, pp. 347–366, (1973). An eigenvector based spectral estimator also may be substituted such as that called MUSIC as defined by R. O. Schmidt in his article entitled "Multiple Emitter Localization and Signal Parameter Estimation", *In Proc. RADC Spectrum Estimation Workshop*, Griffiths AFB, N.Y., pp. 243–258, (1979). The eigenvector based method ESPRIT may also be applied. While these estimators may be too computationally intensive to be truly real time, an alternate version of the maximum entropy method proposed by J. P. Burg in his article entitled "Maximum Entropy Spectral Analysis", *In Proc. of the 37th Annual International SEG Meeting*, Oklahoma City, OK., (1967) may be used. However, in using the maximum entropy method (a kind of a least squares fit) care must be exercised to avoid potential problems associated with line splitting and bias errors. Prony's method and the Auto Regressive Moving Average Estimator (kinds of least squares fit) also may be applied. The Maximum Likelihood method also is applicable.

The computation of the Wigner-Ville distribution is straight forward by a variety of conventional architecture and is composed of three main parts that include the calculation of the analytical signal $z(t)$ from the linear FM signal (real signal) $s(t) = a(t) \cos \phi(t)$ where $\phi(t) = 2\pi(s_0 t + \alpha t^2)$, the formulation of the Wigner-Ville kernel sequence $$z\left(t + \frac{\tau}{2}\right)z^*\left(t - \frac{\tau}{2}\right)$$

which is followed by a Wigner-Ville frequency analysis of the kernel sequence by the high resolution estimators listed immediately above which include the computations based on the least squares approximations or eigensystem analysis. The computations are implemented in real time using either optical processing or special purpose LSI semiconductor components. H. H. Szu in his article "Two-dimensional Optical Processing of One-dimensional Acoustic Data", *Optical Engineering* 21, pp. 804–813, presents a procedure for implementing the computations by optical processing and B. Bouachache et al in their article "An Efficient Implementation for Real Time Applications of the Wigner-Ville Distribution", *SPIE Real Time Signal Processing IX;* San Diego, CA., (August 1986) provide an implementation for the computation using LSI semiconductor components.

The use of the analytic signal is necessary to avoid low frequency artifacts in the Wigner-Ville distribution and was originally proposed by Ville in his 1948 paper cited above when he introduced the concept of the complex analytic signal. The actual computation of the the analytic signal z(t) can be made in the time domain using either Finite Impulse Response (FIR) or Infinite Impulse Response (IIR) filters. The computation of the analytic signal z(t) can be made also in the frequency domain using an appropriate processor for a discrete Fourier transform algorithm, such as the fast Fourier transform as it is applied in the paper by Bouachache referred to immediately above.

In the time domain the complex analytical signal z(t) is obtained from the real signal s(t) by adding an imaginary component which is the Hilbert-transform, H [*], of the real signal. This is set out as equation (2) above.

In the frequency domain the Fourier transform of the real signal S(f), is doubled for f>0, unaltered for f=0 and set to zero for f<0.

The frequency analysis of the kernel sequence $$z\left(t + \frac{\tau}{2}\right)z^*\left(t - \frac{\tau}{2}\right)$$

has traditionally been done through the use of the discrete Fourier transform (DFT) implemented with the fast Fourier transform (FFT) algorithm which is not considered as being a high resolution estimator. However, when a "chirped" signal (linear FM signal) is used in an echographic application when there are a small number of discrete scatterers, then the kernel sequence of the Wigner-Ville distribution is approximated as a small number of sinusoids in noise. For these conditions the DFT is a poor estimator of the presence of the sinusoids. As a consequence the present invention provides a high resolution spectral estimator based, for example, on least squares approximation or eigensystem analysis applied to achieve a degree of resolution of an order of magnitude greater than the traditional analysis.

Stated in a more explicit manner, equation (6) may be interpreted in two different ways. When the input signals are viewed as continuous functions, then the product of $$z\left(t + \frac{\tau}{2}\right)z^*\left(t - \frac{\tau}{2}\right),$$

called the kernel, is handled as a Fourier transform integral. That is what we are looking for, a spectral decomposition of the kernel. It is also observed that this equation is valid for discrete values of the parameters t and $\tau$ in that case we have a discrete kernel $$z\left(t + \frac{\tau}{2}\right)z^*\left(t - \frac{\tau}{2}\right)$$

and that the exponential part of the equation may now be interpreted as a discrete Fourier transform.

Now the essence of the invention is to observe that the discrete Fourier transform of some function, here the kernel $$z\left(t + \frac{\tau}{2}\right)z^*\left(t - \frac{\tau}{2}\right),$$

is equivalent to performing a high resolution estimation such as a kind of least squares fit of a set of sinusoids subject to a number of conditions in which we can use a-priori information. If there is no other assumption made than that, all of the sinusoids are harmonics of a fundamental, then we find that the expression as given in equation (6) is directly interpreted as the least squares fit.

The chirp signal has been transmitted. The received signal, the explicit form of the bilinear form $$z\left(t + \frac{\tau}{2}\right)z^*\left(t - \frac{\tau}{2}\right)$$

comes back in the case of our chirp transmitted signal and is analyzed. It can be shown that for the case of a transmitted chirp signal and a finite number of discrete scatterers that the kernel is known to be precisely composed of a finite number of sinusoids, which are not necessary multiples of a fundamental basic period. That is, the latter would be the case only if the reflectors which give rise to the return signal were equally spaced in range. But, for an arbitrary distribution of reflectors which more accurately models nature, the kernel also is going to be composed of sinusoids, but the sinusoids may have nonharmonically related frequencies. Because of this composition, the concept of a least squares step with nonharmonically related sinusoids, will apply and such a fit has the potential of an order of magnitude or more increase in the resolution that can be achieved by a direct application of the mathematics of equation (6).

This is the key step in the inventive process of going from an ordinary resolution to a high resolution. That is, showing that the signal must be in the form of sinusoids and showing that those sinusoids no longer are multiples of the fundamental basic period, allows the taking and applying of mathematics to extract those sinusoids to the best that the signal to noise ratio of the received signal will allow.

In many practical applications such as radar/sonar, seismic and bio-medical echography a linear cross Wigner-Ville distribution is the appropriate form for the signal analysis since this form corresponds to the two-dimensional Fourier transform of the output of a matched filter receiver. When a linear FM signal is used for the transmitted signal then a generalized high-resolution Wigner-Ville analysis can be defined. This generalized analysis follows from the observation that the kernel of the cross Wigner-Ville distribution can be approximated as a small number of discrete sinusoids. Under these conditions the aforeidentified high resolution estimator such as least squares spectral estimations or eigensystem analysis can be substituted for the conventional discrete Fourier transform in the definition of the Wigner-Ville distribution with a corresponding increase in resolution.

Referring to now FIG. 1 of the drawings a linear FM signal s(t) is received at a receiver 10. The receiver has a means for translating 11 the signal s(t) to an analytical signal z(t). The literature is replete with examples of appropriate FIR or IIR filter banks and processors to implement a discrete Fourier transform such as the FFT or the CZT.

From the filter bank the analytic signal z(t) is fed to a kernel sequence formulator 15 which performs a time domain and frequency domain transform of the analytic signal. A typical architecture for this function could optically implement this function in analog by a suitable array of acoustic Bragg cells or could digitally perform this function using conventional semiconductor technology.

The means for frequency analyzing 20 by high resolution estimation is implemented by a number of hardware applications. The hardware applications are readily fabricated and appropriately coupled to achieve least squares fits according to the Prony's, Maximum Entropy, and Auto Regressive Moving Average method estimators. Eigenvector Based methods such as MUSIC and ESPRIT can be implemented to achieve the described resolution in manners well established in the art. The Maximum Likelihood method also can apply as well as the other methods of spectral analysis enumerated in S. L. Marples *Digital Spectral Analysis*, Prentice Hall (1987).

Figure 2:
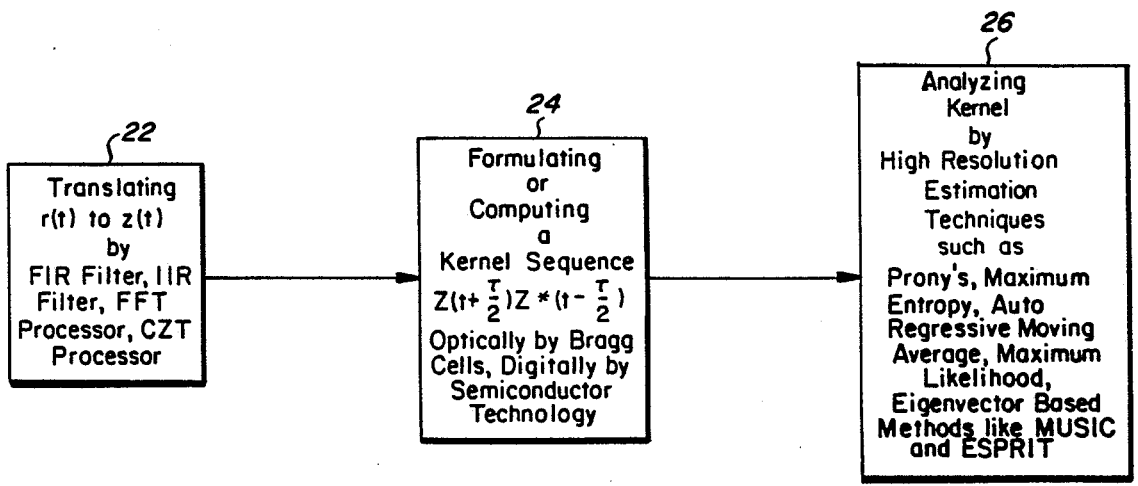
FIG. 2 sets forth a block diagram representation of the preferred methods embracing the inventive concept for improving resolution.

Looking to FIG. 2 of the drawings a block diagram of the method of improving the resolution of a linear FM signal, first calls for the translating 22 of a linear FM signal s(t) to an analytical signal form z(t). Next the formulating or computing 24 of the analytic signal form z(t) into a Wigner-Ville kernel sequence is performed. An analyzing 26 of the frequency of the kernel sequence $$z\left(t+\frac{\tau}{2}\right)z^*\left(t-\frac{\tau}{2}\right)$$

high resolution estimation such as variations of a least squares approximation provides an improved time/frequency representation of the linear FM signal. Alternately, an analyzing 26 of the kernel sequence may be by an eigenvector spectral estimator such as MUSIC and ESPRIT to provide the time/frequency representation; the Maximum Likelihood method also might apply.

The foregoing thorough description of the inventive concept has made reference to numerous articles familiar to those skilled in the art to which this invention pertains. These references are included herewith as Appendix A for a reader's convenience.

Obviously, many modifications and variations of the present invention are possible in the light of the above teachings. It is therefore to be understood that within the scope of the appended claims the invention may be practiced otherwise than as specifically described.

We claim:

1. A method of improving the resolution of a linear FM signal $s(t)=a(t)\cos\Phi(t)$ where $\Phi(t)=2\pi(s_0 t+\alpha t^2)$ and in which $\alpha$ is a chirp parameter comprising the steps of:

translating in translating means received linear FM signals $r(t)=\Sigma^N_{i=1} a_i s(t-\tau_i)$ to an analytic signal of the form $z(t)=\Sigma^N_{i=1} a_i j\Phi(t-\tau_i)$;

formulating in formulating means the analytic signal form z(t) into a Wigner-Ville kernel sequence $z(t+\tau/2)z^*(t-\tau/2)$;

analyzing in analyzing means the frequency of the kernel sequence $z(t+\tau/2)z^*(t-\tau/2)$ by a high resolution estimation technique to provide a signal having an improved time/frequency representation; and applying the improved time/frequency representation signal in an appropriate processing means to present a degree of resolution of an order of magnitude greater than a discrete Fourier transform implemented by a fast Fourier transform.

2. A method according to claim 1 in which the high resolution estimation technique is a form of least sequences approximation fit.

3. A method according to claim 1 in which the high resolution estimation technique is known as Prony's method.

4. A method according to claim 1 in which the high resolution estimation technique is known as the Maximum Entropy method.

5. A method according to claim 1 in which the high resolution estimation technique is known as Auto Regressive Moving Average method.

6. A method according to claim 1 in which the high resolution estimation technique is known as Maximum Likelihood method.

7. A method according to claim 1 in which the translating to the analytic signal includes computing in the time domain using finite impulse response (FIR) filters.

8. A method according to claim 7 in which the translating to the analytic signal includes computing in the Fourier domain using a fast Fourier transform (FFT).

9. A method according to claim 7 in which the translating to the analytic signal includes computing in the Fourier domain using a chirp-z-transform (CZT).

10. A method according to claim 1 in which the translating to the analytic signal includes computing in the time domain using infinite impulse response (IIR) filters.

11. A method according to claim 1 in which the formulating step is the analog computing optically using Bragg cells.

12. A method according to claim 1 in which the formulating step is the digital computing using semiconductor technology.

13. A method of improving the resolution of a linear FM signal $s(t)=a(t)\cos\Phi(t)$ where $\Phi(t)=2\pi(s_0 t+\alpha t^2)$ and in which $\alpha$ is a chirp parameter comprising the steps of:

translating in translating means received linear FM signals $r(t)=\Sigma^N_{i=1} a_i s(t-\tau_i)$ to an analytic signal of the form $z(t)=\Sigma^N_{i=1} a_1 j\Phi(t-\tau_i)$;

formulating in formulating means the analytic signal form z(t) into a Wigner-Ville kernel sequence $z(t+\tau/2)z^*(t-\tau/2)$;

analyzing in analyzing means the frequency of the kernel sequence $z(t+\tau/2)z^*(t-\tau/2)$ by a high resolution eigenvector spectral estimator to provide a signal having an improved time/frequency representation; and applying the improved time/frequency representation signal in an appropriate processing means to present a degree of resolution of an order of magnitude greater than a discrete Fourier transform implemented by a fast Fourier transform.

14. A method according to claim 13 in which the high resolution estimation technique is known as multiple signal classification (MUSIC).

15. A method according to claim 13 in which the high resolution estimation technique is known as eigenvector signal parameter technique (ESPRIT).

16. A method according to claim 13 in which the high resolution estimation technique is known as Pisarenko's method.

17. A method according to claim 13 in which the translating to an analytic signal step includes computing in the time domain using finite impulse response (FIR) filters.

18. A method according to claim 17 in which the translating step includes a computing in the Fourier domain using a fast Fourier transform (FFT).

19. A method according to claim 17 in which the translating step includes a computing in the Fourier domain using a chirp-z-transform (CZT).

20. A method according to claim 13 in which the translating to an analytic signal step includes computing in the time domain using infinite impulse response (IIR) filters.

21. A method according to claim 13 in which the formulating step is the analog computing optically using Bragg cells.

22. A method according to claim 13 in which the formulating step is the digital computing using semiconductor technology.

23. An apparatus for improving the resolution of a linear FM signal $s(t)=a(t) \cos \Phi(t)$ where $\Phi(t)=2\pi(s_0 t + \alpha t^2)$ and in which $\alpha$ is a chirp parameter comprising:
means for translating received linear FM signals $(r(t)=\Sigma^N_{i=1} a_i s(t-\tau_i)$ to an analytic signal of the form $z(t)=\Sigma^N_{i=1} a_i j \Phi(t-96\ _i)$;
means for formulating the analytic signal form $z(t)$ into a Wigner-Ville kernel sequence $z(t+\tau/2)z^*(t-\tau/2)$; and
means for analyzing the frequency of the kernel sequence $z(t+\tau/2)z^*(t-\tau/2)$ by a high resolution estimator technique to provide a signal having an improved time/frequency representation to achieve a degree of resolution in associated processing means of an order of magnitude greater than a discrete Fourier transform implemented by a fast Fourier transform.

24. An apparatus according to claim 23 in which the means for analyzing includes a means for implementing a form of least squares approximation fit.

25. An apparatus according to claim 23 in which the means for translating to the analytic signal includes means for computing in the time domain using finite impulse response (FIR) filters.

26. An apparatus according to claim 23 in which the means for translating to the analytic signal includes means for computing in the time domain using infinite impulse response (IIR) filters.

27. An apparatus according to claim 23 in which the means for translating to the analytic signal includes means for computing in the Fourier domain using a fast Fourier transform (FFT).

28. An apparatus according to claim 23 in which the means for translating to the analytic signal includes means for computing in the Fourier domain using a chirp-z-transform (CZT).

29. An apparatus accordin to claim 23 in which the means for formulating further includes a means for optically implementing in analog using an array of Bragg cells.

30. An apparatus according to claim 23 in which the means for formulating further includes a means for digitally implementing using conventional semiconductor technology.

31. An apparatus for improving the resolution of a linear FM signal $s(t)=a(t) \cos \Phi(t)$ where $\Phi(t)=2\pi(s_0 t + \alpha t^2)$ and in which $\alpha$ is a chirp parameter comprising:
means for translating received linear FM signals $r(t)=\Sigma^N_{i=1} a_i s(t-\tau_i)$ to an analytic signal of the form $z(t)=\Sigma^N_{i=1} a_i j \Phi(t-\tau_i)$;
means for formulating the analytic signal form $z(t)$ into a Wigner-Ville kernel sequence $z(t+\tau/2)z^*(t-\tau/2)$; and
means for analyzing the frequency of the kernel sequence $z(t+\tau/2)z^*(t-\tau/2)$ by a high resolution eigenvector spectral estimator to provide a signal having an improved time/frequency representation to achieve a degree of resolution in associated processing means of an order of magnitude greater than a discrete Fourier transform implemented by a fast Fourier transform.

32. An apparatus according to claim 31 in which the eigenvector spectral estimation technique is known as multiple signal classification (MUSIC).

33. An apparatus according to claim 31 in which the eigenvector spectral estimation technique is known as eigenvector signal parameter technique (ESPRIT).

34. An apparatus according to claim 31 in which the means for translating to the analytic signal further includes means for computing in the time domain using finite impulse response (FIR) filters.

35. An apparatus according to claim 34 in which the means for translating to the analytic signal further includes means for computing in the Fourier domain using a fast Fourier transform (FFT).

36. An apparatus according to claim 34 in which the means for translating to the analytic signal further includes means for computing in the Fourier domain using a chirp-z-transform (CZT).

37. An apparatus according to claim 31 in which the means for translating analytic signal further includes means for computing in the time domain using infinite impulse response (IIR) filters.

38. An apparatus according to claim 31 in which the means for formulating further includes a means for optically implementing in analog using an array of Bragg cells.

39. An apparatus according to claim 31 in which the means for formulating further includes a means for digitally implementing using conventional semiconductor technology.

* * * * *

UNITED STATES PATENT AND TRADEMARK OFFICE
CERTIFICATE OF CORRECTION

PATENT NO. : 4,894,795

DATED : 16 January 1990

INVENTOR(S) : Harper J. Whitehouse and Boualem Boashash

It is certified that error appears in the above-identified patent and that said Letters Patent is hereby corrected as shown below:

On the title page:

Change the address of co-inventor Boualem Boashash from "Quunsland, Austria" to -- Queensland, Australia --.

Signed and Sealed this

Twelfth Day of February, 1991

Attest:

HARRY F. MANBECK, JR.

Attesting Officer  Commissioner of Patents and Trademarks